(12) United States Patent
Heggem

(10) Patent No.: US 10,534,820 B2
(45) Date of Patent: *Jan. 14, 2020

(54) ENHANCED BUYER-ORIENTED SEARCH RESULTS

(76) Inventor: Richard A. Heggem, Morgan Hill, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/340,905

(22) Filed: Jan. 27, 2006

(65) Prior Publication Data

US 2007/0179942 A1 Aug. 2, 2007

(51) Int. Cl.
*G06F 16/00* (2019.01)
*G06F 16/9535* (2019.01)
*G06Q 30/02* (2012.01)
*G06Q 30/06* (2012.01)

(52) U.S. Cl.
CPC ......... *G06F 16/9535* (2019.01); *G06Q 30/02* (2013.01); *G06Q 30/06* (2013.01)

(58) Field of Classification Search
USPC ...................................... 707/10, 5, 706, 722
See application file for complete search history.

(56) References Cited

U.S. PATENT DOCUMENTS

| | | | |
|---|---|---|---|
| 5,592,375 A | 1/1997 | Salmon et al. | |
| 5,970,492 A | 10/1999 | Nielsen | |
| 6,029,175 A | 2/2000 | Chow et al. | |
| 6,119,101 A * | 9/2000 | Peckover | 705/26 |
| 6,460,036 B1 | 10/2002 | Herz | |
| 6,785,671 B1 * | 8/2004 | Bailey et al. | 707/5 |
| 6,826,594 B1 * | 11/2004 | Pettersen | 707/E17.117 |
| 6,845,374 B1 * | 1/2005 | Oliver et al. | 707/5 |
| 7,113,919 B1 | 9/2006 | Norris et al. | |
| 7,124,107 B1 | 10/2006 | Pishevat et al. | |
| 7,222,109 B1 * | 5/2007 | Flanagan et al. | 705/80 |
| 7,599,938 B1 * | 10/2009 | Harrison, Jr. | 705/7.29 |
| 8,150,757 B1 * | 4/2012 | Sieffert et al. | 705/37 |
| 2001/0034631 A1 | 10/2001 | Kiselik | |
| 2001/0051913 A1 | 12/2001 | Vashistha et al. | |
| 2001/0051943 A1 * | 12/2001 | Drucker et al. | 707/3 |
| 2002/0013735 A1 | 1/2002 | Arora et al. | |
| 2002/0111897 A1 | 8/2002 | Davis | |

(Continued)

OTHER PUBLICATIONS

"Psychological Discussion Groups", Jun. 19, 2001, retrieved from http://web.archive.org/web/20010619151105/http://www.psychnet-uk.com/discussion_groups/index_discussion_groups.htm.*

(Continued)

*Primary Examiner* — Son T Hoang

(57) ABSTRACT

A system and architecture for enhancing search results generated by an Internet search engine, so that those search results include enhanced buyer-oriented information, is disclosed. According to one aspect, a list of search results generated by an Internet search engine comprises one or more search results that are associated with one or more URLs in a set of URLs. For each such URL, seller-specific information, which may be based on and/or comprise ratings that are associated with registered selling entities that are associated with that URL, is presented in association with that URL's corresponding search result in the list of search results. A user who submitted query terms, based upon which the list of search results was generated, can use the presented rating information to determine which of the search results to investigate further.

28 Claims, 4 Drawing Sheets

(56) References Cited

U.S. PATENT DOCUMENTS

| | | | |
|---|---|---|---|
| 2002/0165814 A1 | 11/2002 | Lee et al. | |
| 2002/0165967 A1* | 11/2002 | Morgan | 709/230 |
| 2002/0174051 A1* | 11/2002 | Wise | 705/37 |
| 2002/0174089 A1 | 11/2002 | Tenorio | |
| 2002/0186255 A1* | 12/2002 | Shafron et al. | 345/810 |
| 2002/0198818 A1 | 12/2002 | Scott et al. | |
| 2003/0004850 A1 | 1/2003 | Li et al. | |
| 2003/0014331 A1* | 1/2003 | Simons | 705/27 |
| 2003/0033298 A1* | 2/2003 | Sundaresan | 707/5 |
| 2003/0055743 A1* | 3/2003 | Murcko, Jr. | 705/26 |
| 2003/0074298 A1 | 4/2003 | Darum | |
| 2003/0083961 A1* | 5/2003 | Bezos et al. | 705/27 |
| 2003/0172022 A1 | 9/2003 | Coyne et al. | |
| 2004/0139032 A1* | 7/2004 | Rowan | G06Q 30/06 705/80 |
| 2004/0254832 A1* | 12/2004 | Harkin | 707/10 |
| 2004/0260688 A1* | 12/2004 | Gross | 707/3 |
| 2004/0267561 A1* | 12/2004 | Meshkin et al. | 705/1 |
| 2004/0267731 A1* | 12/2004 | Gino Monier et al. | 707/3 |
| 2005/0004889 A1* | 1/2005 | Bailey et al. | 707/1 |
| 2005/0004930 A1* | 1/2005 | Hatta | 707/102 |
| 2005/0033641 A1* | 2/2005 | Jha | G06Q 30/02 705/14.53 |
| 2005/0055306 A1 | 3/2005 | Miller et al. | |
| 2005/0075945 A1* | 4/2005 | Hodge et al. | 705/26 |
| 2005/0096955 A1 | 5/2005 | Sorensen | |
| 2005/0119957 A1* | 6/2005 | Faber et al. | 705/35 |
| 2005/0216341 A1* | 9/2005 | Agarwal | G06Q 30/02 705/14.64 |
| 2005/0278199 A1* | 12/2005 | Ghani | 705/4 |
| 2006/0064411 A1* | 3/2006 | Gross et al. | 707/3 |
| 2006/0069623 A1* | 3/2006 | MacDonald Korth et al. | 705/26 |
| 2006/0085373 A1* | 4/2006 | Dhillion | G06Q 30/02 |
| 2006/0206413 A1* | 9/2006 | Van Luchene et al. | 705/37 |
| 2006/0229902 A1* | 10/2006 | McGovern | G06Q 10/06 705/321 |
| 2006/0271460 A1* | 11/2006 | Hanif | 705/35 |
| 2007/0081662 A1* | 4/2007 | Altberg | G06O 30/02 379/355.03 |

OTHER PUBLICATIONS

"The Feedback Forum", Oct. 12, 1999, retrieved from http://web.archive.org/web/19991012065814/http://pages.ebay.com/services/forum/feedback.html.*

EBay (www.ebay.com), pp. 1-4.*

EBay (ebay.com).*

U.S. Appl. No. 10/752,163, filed Jan. 5, 2004, Office Action dated Dec. 18, 2006.

Scott2, U.S. Appl. No. 09/571,792 that was incorporated in its entirety into PGPub 2002/0198818 (para 001), now abandoned, dated May 16, 2000.

U.S. Appl. No. 10/752,163, filed Jan. 5, 2004, Office Action dated Jun. 19, 2007.

\* cited by examiner

| Filter | Seller | | Company | | Product | |
|---|---|---|---|---|---|---|
| Sellers: 1-4 of 4 | | | | | | << Previous | 1 | Next >> |
| Sellers that PASSED my hard filters | | | | | | |
| 50% | Timothy James | 👐(1) ↻(0) ⓣ(2) | DESIGNLOGIC INC | 👆(1) | HCI test | 👆(1) Question | Invite |
| 50% | Christopher Jon | 👐(2) ↻(1) ⓣ(0) | WEBMORPHS INC | NR(0) | (More than one) | NR(0) Question | Invite |
| 50% | Devin Nguyen | 👐(4) ↻(0) ⓣ(1) | GAMES PARADISE INC (Unverified) | 👆(4) | (More than one) | 👆(2) Question | Invite |
| Sellers that FAILED my hard filters | | | | | | |
| 0% | Garett Jones | NR(0) ↻(0) ⓣ(0) | MOON (Unverified) | NR(0) | SEO Tuning | NR(0) Question | Invite |

Fig. 2

ENHANCED BUYER-ORIENTED SEARCH RESULTS

RELATED APPLICATIONS

The present application is related to U.S. patent application Ser. No. 10/752,163, which was filed on Jan. 5, 2004, which is titled "CONNECTING BUSINESS-TO-BUSINESS BUYERS AND SELLERS," and also to U.S. patent application Ser. No. 11/153,929, which is also titled "CONNECTING BUSINESS-TO-BUSINESS BUYERS AND SELLERS," the applicant for both of which applications is Richard A. Heggem, and both of which applications are incorporated by reference in their entirety for all purposes as though fully and originally disclosed herein.

FIELD OF THE INVENTION

The present invention relates generally to search engines and, more specifically, to a method for enhancing search results returned by search engines so that those search results comprise in-depth seller information that is useful to a buyer in evaluating those search results.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Internet search engines, such as those offered to the public by such companies as Google and Yahoo!, have become a commonplace fixture in the modern world. By entering a set of query terms into an Internet search engine, one can usually obtain a vast set of search results that pertain, to some extent, to the query terms entered. Each search result typically corresponds to a page accessible via the Internet. Each search result typically takes the form of a Uniform Resource Locator (URL), or "link," accompanied by a descriptive title and a short blurb or abstract that indicates at least a part of the content of the page to which the search result corresponds. If one activates a link in one's Internet browser, the Internet browser loads the page to which the link refers.

Internet search engines can be used to find information on almost any subject and for almost any imaginable purpose. Internet search engines are commonly used for business purposes. For example, a potential buyer might be looking for a particular product or service that would be useful in furthering the buyer's business needs. A buyer who is considering the purchase of a particular product might enter, into a search interface of an Internet search engine, query terms that describe the product for which the buyer is searching.

More often than not, due in part to the sheer magnitude of pages accessible via the Internet, the quantity of search results returned by the Internet search engine will be staggering. Usually, the number of search results returned will be far too great to allow the buyer to investigate each search result returned. Not all of the search results will actually be of interest to the buyer, either. All too often, the only way that a buyer can attempt to find a truly interesting page is by reading each title and abstract for each search result and making some judgment, based exclusively on that title and abstract, about whether the search result merits further investigation.

Search results are presented in an order that is usually represented, by the Internet search engine returning the search results, as a measure of the relevance of those results in relation to the query terms entered. For obvious reasons, search results that occur toward the top of a list of search results are more likely to be investigated than search results that occur toward the bottom of such a list. Page authors, some of whom are sellers of products and services, are well aware of this fact. Consequently, page authors often take actions that are designed to elevate their pages within lists of search results returned by Internet search engines. For example, a seller might fill his page with hidden metadata that contains an abundance of words that people are known to search for most frequently, even if the content of the seller's page actually has little or nothing to do with those words. For another example, some popular Internet search engines actually sell "featured" spots that are guaranteed, to purchasers of those spots, to be displayed at the top of certain sets of search results.

As a consequence of sellers' abilities to control where a page occurs in an ordered list of search results, the order in which search results are presented to a prospective buyer has very little to do with the buyer's interests, and has almost everything to do with the sellers' interests. The fact that a particular search results occurs at the forefront of a list of search results does not tell the buyer anything about whether the seller's product or service is better than those that appear lower in the list. The position of a search result in a list of search results also tells the buyer nothing about whether the seller deals fairly with his customers. As a general rule, the orderings of lists of search results have been much more seller-oriented than buyer-oriented.

Thus, a prospective buyer, having obtained a multitude of search results from an Internet search engine, has still gained very little information in those results that will assist him in finding a high-quality seller that is likely to offer a high-quality product or service. Any qualitative information represented in the search results has a good chance of being biased or misleading, since such information originates from those whose interests often compel them to be less than perfectly honest and candid. While the search results may help a prospective buyer to locate products and services in which the buyer might be interested, the search results cannot adequately inform the buyer about which sellers the buyer can trust.

Thus, a prospective buyer's search on the Internet for a high-quality product or service offered by a high-quality seller is, in many respects, similar to a search for a needle in a haystack.

Based on the foregoing, an approach for presenting seller-unbiased information that better enables a prospective buyer to determine the quality of sellers, services, and products associated with Internet search results would be highly desirable.

SUMMARY OF THE INVENTION

A system and architecture for enhancing search results generated by an Internet search engine, so that those search results include enhanced buyer-oriented information, is disclosed. The results may be presented in the context of a prospective buyer's own specified information (i.e., what the prospective buyer is looking for). According to one aspect, a list of search results generated by an Internet search engine comprises one or more search results that are associated with one or more URLs in a set of URLs. For each such URL, seller-specific information, which may include ratings that are associated with registered selling entities that are associated with that URL, is presented in association with that URL's corresponding search result in the list of search results. A user who submitted query terms, based upon which the list of search results was generated, can use the presented seller-specific information to determine which of the search results to investigate further.

The seller-specific information may comprise additional items of information that a prospective buyer would find beneficial. Some of these additional items of information may be customized based on a prospective buyer's specified preferences. Some of these additional items of information, which might be displayed along with search results, are described in greater detail below.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a diagram that illustrates an example of selling entity information that may be presented on a dynamically generated page, according to an embodiment of the invention;

DETAILED DESCRIPTION OF THE INVENTION

Figure 1:
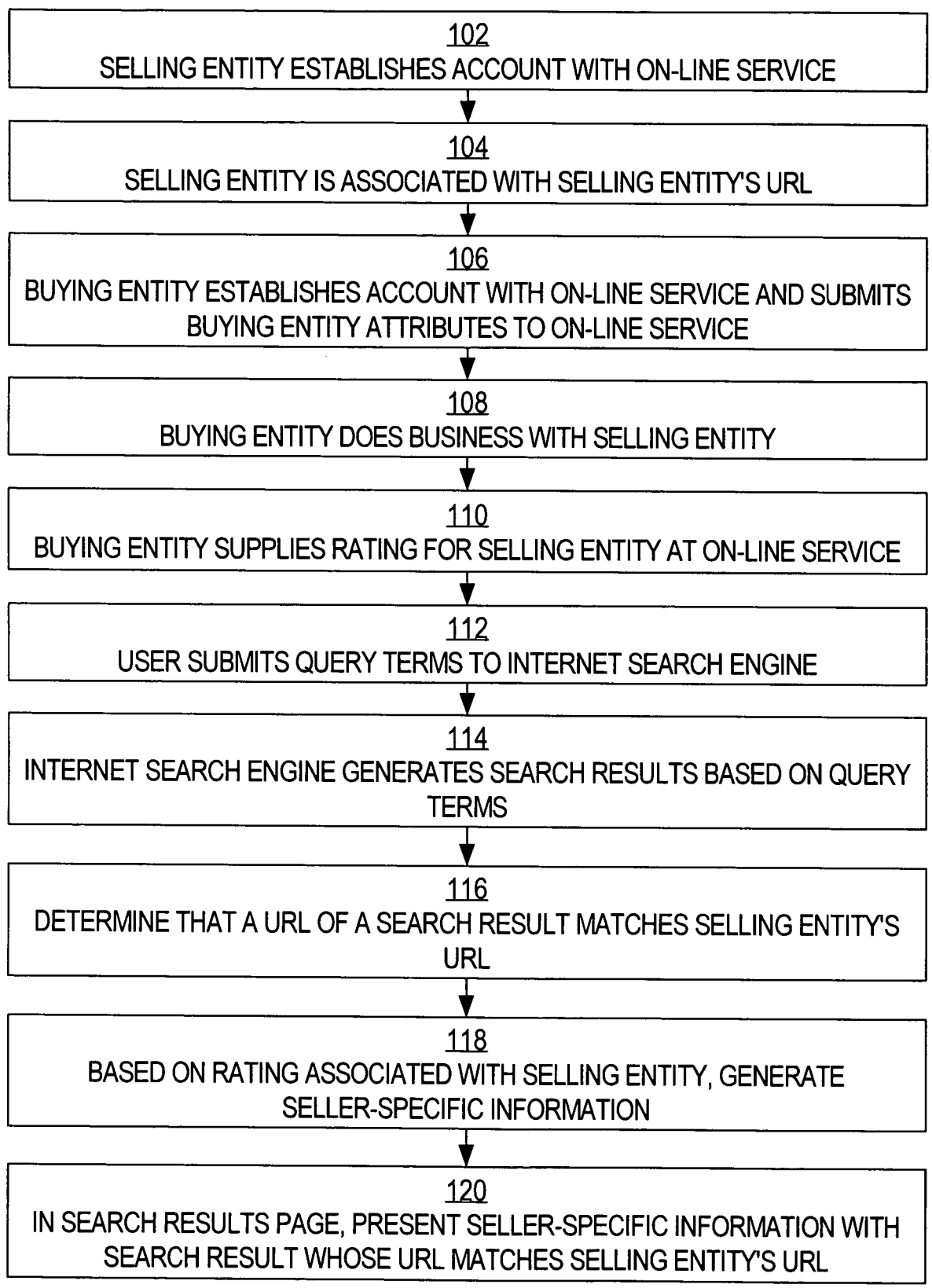
FIG. 1 is a flow diagram that depicts an example of a technique by which buying entities rate selling entities and by which seller-specific information, which may be based on and/or indicate such ratings, is displayed in connection with Internet search results, according to an embodiment of the invention.

A method and apparatus for connecting buying entities and selling entities is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. In some instances, flow diagrams are used to depict steps performed in various embodiments of the invention. The invention is not limited to the particular order of steps depicted in the figures and the order may vary, depending upon the requirements of a particular implementation. Furthermore, steps that are depicted and described may be removed and/or other steps may be added, depending upon the requirements of a particular implementation. Various aspects of the invention are described hereinafter in the following sections:

I. OVERVIEW
II. EXAMPLE FLOW
III. ACCESSING ENHANCED BUYER-ORIENTED INFORMATION
IV. DETAILED RATING INFORMATION
V. ONGOING RELATIONSHIP RATING
VI. BUYER-SPECIFIC HARD FILTER RATING
VII. BUYER-SPECIFIC TRUSTED BUYER NETWORK INDICATOR
VIII. EXTENSIBLE DISPLAY
IX. SORTING SEARCH RESULTS
X. NARROWING THE SCOPE OF SEARCH RESULTS
XI. ENCOURAGING NEW SELLING ENTITIES TO PARTICIPATE
XII. ENCOURAGING NEW BUYING ENTITIES TO PARTICIPATE
XIII. ARCHITECTURAL EXAMPLES
XIV. RESOLVING URLS
XV. OWNERSHIP CONSIDERATIONS
XVI. BASING PER-CLICK CHARGES ON BUYING ENTITY ATTRIBUTES
XVII. OBSCURING SEARCH RESULTS FROM UNQUALIFIED BUYING ENTITIES
XVIII. IMPLEMENTATION MECHANISMS, ALTERNATIVES & EXTENSIONS

I. Overview

Techniques for automatically enhancing Internet search results, so that those search results include buyer-oriented, seller-specific information, are disclosed. According to one aspect, each URL in a set of one or more registered URLs is associated with a separate set of one or more registered selling entities. The selling entities may be individual people, for example. Each of the selling entities is associated with one or more ratings from one or more registered buying entities that have done business with that selling entity. The buying entities also may be individual people, for example.

According to one aspect, a list of search results generated by an Internet search engine comprises one or more search results that are associated with one or more of the URLs in the set of URLs. For each such URL, seller-specific information, which may be based on and include the ratings that are associated with the registered selling entities that are associated with that URL, is presented in association with that URL's corresponding search result in the list of search results. A user who submitted query terms, based upon which the list of search results was generated, can use the presented seller-specific information to determine which of the search results to investigate further.

For example, in a business-to-business connectivity system such as that described in U.S. patent application Ser. Nos. 11/153,929 and 10/752,163, a URL, "www.thiscompany.com," might be associated with two separate selling entities who both work for the company that owns the URL. Each of these selling entities may have a separate account within the system. Buying entities that do business with the selling entities may use the system to provide ratings relative to the selling entities. The system associates these ratings with the selling entities, as is described in U.S. patent application Ser. Nos. 11/153,929 and 10/752,163.

Continuing the example, a prospective buyer might submit, to an Internet search engine, query terms that cause the Internet search engine to generate a list of search results. The list might include a particular search result that corresponds to the "www.thiscompany.com" URL. As a consequence of the list containing the particular search result, the list may be automatically enhanced to include seller-specific information that is based on the ratings that are associated with the two selling entities that are associated with the "www.thiscompany.com" URL. The seller-specific information may be presented in proximity with the particular search result in the list of search results that is presented to the prospective buyer.

If the seller-specific information (potentially including ratings) indicates that other buying entities have had a good business experience with the selling entities associated with the particular search result's URL, then the prospective buyer will be motivated to investigate the particular search result further by activating the link that is presented with the particular search result. Alternatively, if the seller-specific information (potentially including ratings) indicates that other buying entities have had a bad business experience with the selling entities associated with the particular search result's URL, then the prospective buyer will be motivated to ignore the particular search result and investigate other search results in the list. The seller-specific information presented in conjunction with the Internet search results greatly assists potential buyers in choosing which search results to investigate further.

Because selling entities know that their chances of being investigated via Internet search engines hinge on whether buying entities give them good ratings, selling entities are more likely to treat all of their customers and clients with the utmost care. Thus, the techniques described above help to improve the whole marketplace.

According to one embodiment of the invention, people register with an on-line business-to-business connectivity service by establishing buyer accounts and/or seller accounts. Those people who establish buyer accounts are "buying entities." Those people who establish seller accounts are "selling entities." Upon establishing their accounts, buying entities and selling entities can specify, to the on-line service, attributes and characteristics that they possess in their capacities as buyers and sellers.

For example, attributes of a buying entity may include whether the entity is a decision maker, whether the entity has signing authority, characteristics of a decision process by which the entity makes business decisions, the industry in which the entity is involved, the entity's title within the entity's company, the entity's function within the entity's company, the entity's company's revenue, the number of subordinates who report to the entity, the entity's geographical location, the entity's allotted budget, etc. Attributes of a selling entity may include the entity's company name, the entity's company's revenue, the industry in which the entity is involved, one or more references who can vouch for the entity, the entity's costs, products and/or services that the entity offers, resources to which the entity has access, etc. The collection of an entity's attributes form a kind of "DNA" (deoxyribonucleic acid) or "genetic code" for that entity.

In block 104, the selling entity supplies a URL to the on-line business-to-business connectivity service. The submitted URL refers to the selling entity's page on the Internet—the selling entity's "web site." The service establishes an association between the selling entity's account and the URL. Such an association may be stored in a "B2B" (Business-to-Business) database, for example. For example, the selling entity might supply a URL such as "www.thiscompany.com," which might be the URL of a page authored by either the selling entity or a company for whom the selling entity works. As a result, the URL becomes a "registered" URL recognized by the service. According to one embodiment of the invention, multiple different selling entities may be associated with the same URL.

A buying entity's attributes may comprise criteria that a selling entity's attributes must satisfy in order for the selling entity to qualify as a selling entity in which the buying entity might be interested. Similarly, a selling entity's attributes may comprise criteria that a buying entity's attributes must satisfy in order for the buying entity to qualify as a buying entity in which the selling entity might be interested. Buying entities and selling entities may rank and filter each other based on the extent to which they satisfy each other's criteria.

II. Example Flow

FIG. 1 is a flow diagram that depicts an example of a technique by which buying entities rate selling entities and by which seller-specific information, which may be based on and/or indicate such ratings, is displayed in connection with Internet search results, according to an embodiment of the invention. Additional steps, not expressly shown in FIG. 1, also may be performed in various embodiments of the invention.

In block 102, a selling entity establishes an account with an on-line business-to-business connectivity service, thereby becoming a "registered" selling entity. For example, using his Internet browser, a selling entity, such as a salesman who works for a company, may establish a seller account with a business-to-business connectivity service such as is described in U.S. patent application Ser. Nos. 11/153,929 and 10/752,163. Such a business-to-business connectivity service is presently accessible through the URL "www.myhandshake.com."

In block 104, the selling entity supplies a URL to the on-line business-to-business connectivity service. The submitted URL refers to the selling entity's page on the Internet—the selling entity's "web site." The service establishes an association between the selling entity's account and the URL. Such an association may be stored in a "B2B" database, for example. For example, the selling entity might supply a URL such as "www.thiscompany.com," which might be the URL of a page authored by either the selling entity or a company for whom the selling entity works. As a result, the URL becomes a "registered" URL recognized by the service. According to one embodiment of the invention, multiple different selling entities may be associated with the same URL.

In block 106, a buying entity (who may be a person other than the "user" introduced below with reference to block 112) establishes an account with the on-line business-to-business connectivity service, thereby becoming a "registered" buying entity. For example, using his Internet browser, a buying entity, such as a vice president of a corporation, may establish a buyer account with the service. At the time that the buying entity establishes the account, the buying entity may be required to submit, to the service, a set of buying entity attributes that describe the buying entity. According to one embodiment of the invention, a buying entity's registration with the service enables the service to provide, to the buying entity, selling entity information that is tailored based specifically on the buying entity's specified preferences and filter criteria, as is described in greater detail below in sections VI and VII. However, if a user opts not to register with the service, this does not prevent useful, although possibly less customized, information about selling entities from being provided to the user.

In block 108, the buying entity does business with the selling entity. For example, the buying entity may choose to respond to the selling entity's on-line solicitations made to the buying entity via the service. The buying entity may decide to purchase the products and/or services offered in the selling entity's on-line solicitations.

In block 110, after having at least some interaction with the selling entity, the buying entity supplies, to the on-line business-to-business connectivity service, a rating for the selling entity. For example, the buying entity may supply the rating to the service through his Internet browser. The rating may be representative of the extent to which the buying entity is satisfied with the selling entity and/or the selling entity's company and/or the products and/or services that the buying entity purchased from the selling entity, for example. For example, the rating may be a number within a specified range of numbers (e.g., 1 to 10), or a "thumbs up/thumbs down/thumbs sideways" indication of satisfaction or dissatisfaction. Various rating schemes are possible. The service establishes an association between the selling entity's account and the rating. Such an association may be stored in a "B2B" database, for example.

Various different buying entities may establish accounts with the on-line business-to-business connectivity service, and various different buying entities may do business with and provide ratings for the selling entity. The service may associate each such rating with the rated selling entity's account.

In block 112, a user, or "prospective buyer" (who might or might not have an account with the on-line business-to-business connectivity service, and who might be a person other than the buying entity discussed above with reference to blocks 106-110), submits one or more query terms to an Internet search engine. For example, the user might direct his Internet browser to the URL of one of the many popular Internet search engines available today, and enter one or more query terms into a search field displayed on the search engine's page.

The query terms might represent a variety of information. For example, the query terms might represent a specific product or service in which the user is interested. For another example, the query terms might represent a specific company in which the user is interested. For yet another example, the query terms might represent a problem that the user would like to have solved. Beneficially, by employing an Internet search engine to perform a search, the user can take advantage of existing associations between phrases and pages on the Internet. The user's search is not restricted to any particular category of information.

In block 114, the Internet search engine generates a set of search results based on the query terms. For example, the Internet search engine may select, from among a body of indexed pages previously discovered on the Internet, a set of pages that the search engine determines to have some relevance to the query terms. Each selected page has an associated URL through which that page can be accessed on the Internet. For each selected page, the Internet search engine may generate a search result that comprises the selected page's URL. The search result may include other descriptive information as well, such as a title and abstract of the corresponding selected page, for example. The Internet search engine may rank the selected pages using some scheme.

In block 116, for each search result in at least a subset of the search results (e.g., the top 100 search results), a determination is made as to whether that search result's associated URL is a "registered" URL that is associated with at least one selling entity's account in the on-line business-to-business connectivity service discussed above. In different embodiments of the invention, this determination may be made in different ways.

According to one embodiment of the invention, this determination is made by the Internet search engine itself before the search results are presented to the user who submitted the query terms. According to another embodiment of the invention, this determination is made by a "toolbar" application that executes on the same computer as the Internet browser of the user who submitted the query terms. In this latter embodiment, for example, the determination may be made after the user's browser has already received at least a subset of the search results from the Internet search engine. In either case, the entity that makes the determination has access to the URL-to-selling entity account associations established via the on-line business-to-business connectivity service as discussed above in block 104. As is discussed above, such associations may be stored in a "B2B" database.

In block 118, for each of the search results determined to be associated with a registered URL that is associated with at least one registered selling entity's account, seller-specific information is generated for that search result. In one embodiment of the invention, the seller-specific information generated for a particular search result is based on the ratings that are associated with the selling entities that are associated with that URL. For example, the seller-specific information may comprise a composite rating that is generated by averaging all of the ratings that are associated with all of the selling entities that are associated with the URL. Other techniques for generating seller-specific information also may be implemented. For example, rating information within the seller-specific information may be "broken down" by selling entity in cases where more that one selling entity is associated with a URL, so that the average rating for each selling entity associated with a particular URL are generated. In one embodiment of the invention, the seller-specific information is generated by the Internet search engine before search results are sent to the user's Internet browser. In another embodiment of the invention, the seller-specific information is generated by a toolbar application after search results have been sent to the user's Internet browser.

In block 120, for each of the search results for which seller-specific information was generated, that seller-specific information is presented to the user who submitted the query terms. For example, the seller-specific information may appear in close proximity to (e.g., immediately underneath) each search result in an ordered list of search results presented to the user via the user's browser. As a result, the user can see whether the selling entities associated with each search result have been rated well or poorly by the user's peers in the marketplace (registered buying entities). Thus, the user can better determine whether to further investigate each search result in the list.

In one embodiment of the invention, the seller-specific information is integrated into the page that is generated and sent to the user's Internet browser by the Internet search engine. In another embodiment of the invention, the page that is sent to the user's Internet browser does not originally contain the seller-specific information. Instead, a toolbar application executing in conjunction with the user's Internet browser (a) detects the page when the Internet browser receives the page, (b) parses and modifies the source code of the page before the Internet browser displays the page, so that the page contains the seller-specific information in the appropriate places, and then (c) causes the Internet browser to display the modified page.

In some embodiments of the invention, the seller-specific information includes information in addition to the rating information that is presented to a prospective buyer in conjunction with search results. For example, if the user who submits the query terms to the Internet search engine is a registered buying entity known to the on-line business-to-business connectivity service, additional information, which is based at least in part on preferences and criteria specified in the user's account, also may be generated and displayed along with the rating information. Some of this additional information is discussed below.

III. Accessing Enhanced Buyer-Oriented Information

As is discussed above, in one embodiment of the invention, search results displayed to a user of an Internet search engine may be enhanced with buyer-oriented information. Such buyer-oriented information may include selling entity ratings previously submitted by registered buying entities, for example.

In one embodiment of the invention, this buyer-oriented information is not initially presented within the search results page that is originally displayed to the user who submitted the query terms. Instead, in one embodiment of the invention, the search results page that is originally displayed to the user contains search results of the kind that are customarily presented by Internet search engines. However, in such an embodiment, that search results page also comprises a link, such as a link labeled "B2B," or "Business-to-Business," or "MyHandshake," which, when activated, causes the user's Internet browser to load a search results page that does contain the buyer-oriented information, such as the selling entity ratings, as described above. Thus, a user has the option of seeing search results enhanced by seller-specific information, or without such enhancements.

In one embodiment of the invention, the link which leads to the enhanced search results page is displayed at the top of the original search results page, above the list of search results. For example, the link might be included with a selection of links that typically appears at the top of each search results page. Such a selection of links might include other links such as "web," "images," "groups," "news," etc., each of which refer to more specialized search results of a particular kind, but which search results are still based on the submitted query terms.

IV. Detailed Rating Information

As is discussed above, rating information that is presented with each search result may be as simple as a single number. Such a number may be generated by averaging all of the ratings that are associated with all of the registered selling entities that are associated with a search result's corresponding URL.

However, in one embodiment of the invention, rating information is "broken down" into more refined subsets before being presented to a user. For example, in one embodiment of the invention, buying entities using the on-line business-to-business connectivity service described in U.S. patent application Ser. Nos. 11/153,929 and 10/752,163 provide separate ratings for (a) selling entities, (b) the companies for which the selling entities work, and (c) the selling entities' products and services. A buying entity might rate a selling entity favorably, but rate the selling entity's company or products unfavorably, for example. Therefore, in one embodiment of the invention, the rating information that is displayed with each search result comprises separate ratings for selling entities, the selling entities' companies, and the selling entities' products and/or services.

Additionally, as is discussed above, multiple different registered buying entities may submit different ratings for selling entities that are associated with the same URL. According to one embodiment of the invention, the different ratings provided by each separate buying entity are represented in the ratings displayed with the search results. For example, if a first buying entity gave a selling entity a "thumbs up," a second buying entity gave that selling entity a "thumbs down," and a third buying entity declined to rate the selling entity entirely, then the rating information shown in conjunction with the corresponding search result might include one "thumbs up" icon, one "thumbs down" icon, and one "NR" (for "not rated") icon. In such an embodiment, the user who views the enhanced search results can tell not only what the average rating for selling entities associated with the search result's URL is, but can also determine the precise rating supplied by each separate registered buying entity.

In one embodiment of the invention, in situations where multiple selling entities are associated with a particular search result's URL, the ratings are "broken down" into the best rating given, the average rating given, and the worst rating given to the selling entities that are associated with the particular search result's URL. In various embodiments of the invention, composite ratings may be generated using various computational techniques, and those composite ratings may be presented within seller-specific information. For example, a composite rating may be generated by multiplying together (a) a selling entity rating, (b) a company rating (of the company for which the selling entity works), and (c) a product rating (of one or more products with which the selling entity is associated). For example, if a selling entity rating is 100%, and the corresponding company and product ratings are 50% and 50%, respectively, then the composite rating for the selling entity may be produced by multiplying 100% by 50% by 50%, which is 25%. For another example, a composite rating may be generated by averaging a selling entity rating, a corresponding company rating, and a corresponding product rating. For example, if a selling entity rating is 100%, and the corresponding company and product ratings are 50% and 50%, respectively, then the composite rating for the selling entity may be produced by averaging 100%, 50%, and 50%, which is 67%.

In one embodiment of the invention, in addition to other seller-specific information, the amount of separate registered selling entities that are associated with each search result's URL are displayed in conjunction with the rest of the seller-specific information for that search result. For example, if five separate registered selling entities are all associated with the URL "www.thiscompany.com," then, next to the other seller-specific information for the search result associated with that URL, the search results page may display the fact that "5 individuals" are associated with that search result's URL.

V. Ongoing Relationship Rating

In one embodiment of the invention, along with other seller-specific information presented with a search result, a number of "ongoing relationships" associated with that search result is displayed. As is discussed above, one or more selling entities may be associated with a search result's URL. Each of these selling entities may be currently involved in one or more "ongoing relationship" phases with separate buying entities in the on-line business-to-business connectivity service.

The number of "ongoing relationships" associated with a search result is the sum of that search result's associated selling entities' "ongoing relationships." For example, if the total number of ongoing relationships in which all selling entities that are associated with the URL "www.thiscompany.com" are currently involved is 27, then, next to the other seller-specific information for the search result with that URL, the search results page may display the fact that "27 ongoing relationships" are associated with that search result.

The concept of "ongoing relationships" is discussed in U.S. patent application Ser. No. 11/153,929 and is summarized below.

Buying entities and selling entities may engage in a continuing relationship with each other using the system described in U.S. patent application Ser. No. 11/153,929. Through this system-maintained relationship, buying entities and selling entities may proceed, with their mutual consent, through various phases of a multi-phase "pipeline." At each phase, buying and selling entities optionally may rate each other. In one embodiment of the invention, these phases comprise, in order, an "information-gathering" phase, a "presentation" phase, an "investigation" phase, an "implementation" phase, and an "ongoing relationship" phase.

Because the "ongoing relationship" phase is the final and potentially never-ending phase in the "pipeline," the willingness of a selling entity to work toward, reach, and continue in an "ongoing relationship" phase with a buying entity can be seen as an indication that the selling entity has a significant level of commitment to his customers. While a selling entity is in an "ongoing relationship" phase with a buying entity, that buying entity still has the opportunity to rate that selling entity. Therefore, the amount of "ongoing relationship" phases associated with a search result is information that a prospective buyer might find very useful in deciding whether to investigate that search result further.

VI. Buyer-Specific Hard Filter Results

A user does not need to be a registered buying entity in order to receive rating information and other seller-specific information that is based on input previously submitted by registered buying entities. If a buying entity opts not to register with the service, this does not prevent the service from providing, to the buying entity, useful, although possibly less customized, information about selling entities. However, according to one embodiment of the invention, when a user is a registered buying entity, the seller-specific information may additionally comprise information that is specific and tailored for the user based on preferences and criteria that are associated with the user's buying entity account.

In one embodiment of the invention, when a user registers with the on-line business-to-business connectivity service and establishes a buying entity account, the user is given the opportunity to specify, through the user's Internet browser, preferences and criteria that are stored in association with the user's account (e.g., in the "B2B" database). Some of these preferences and criteria are discussed in U.S. patent application Ser. Nos. 11/153,929 and 10/752,163.

For example, in one embodiment of the invention, a registered buying entity specifies one or more filter criteria, which are then stored in association with the buying entity's account. When a selling entity establishes a selling entity account, the selling entity may be required, in one embodiment of the invention, to indicate various characteristics of the selling entity (e.g., the geographical locations in which the selling entity does business, the selling entity's role in the company for which he works, the number of employees in the selling entity's company, the approximate annual revenues of the selling entity's company, the general industry in which the selling entity is involved, etc.). These characteristics are called "seller attributes." A selling entity's seller attributes are stored in association with that selling entity's account (e.g., in the "B2B" database).

In one embodiment of the invention, a determination of whether a particular selling entity "passes" a buying entity's specified filter criteria is made by comparing that selling entity's seller attributes with the buying entity's associated filter criteria. If the seller attributes satisfy the filter criteria, then the selling entity "passes" the filter criteria. In one embodiment of the invention, a buying entity may specify some filter criteria as "hard" filter criteria and other filter criteria as "soft" filter criteria.

Additionally, in one embodiment of the invention, when a user registers with the on-line business-to-business connectivity service and establishes a buying entity account, the service instructs the user's Internet browser to store a "cookie" that identifies the user's unique buying entity account. Consequently, an Internet search engine or toolbar application can inspect this stored cookie to identify the user's buying entity account. Alternatively, a toolbar application can require a user to identify his buying entity account to the toolbar application at the time that the toolbar application starts. Using various mechanisms, such as those mentioned above, Internet search engines and/or toolbar applications are able to identify the buying entity account of the user who submits query terms to an Internet search engine.

Because the user's buying entity account can be identified, the filter criteria associated with the buying entity account can be identified and used to generated customized seller-specific information for display with search results. For example, for each selling entity that is associated with a particular search result's URL, a determination can be automatically made (e.g., by an Internet search engine or a toolbar application) as to whether that selling entity satisfies all of the buying entity's "hard" filter criteria. Along with other seller-specific information presented with the search result, the search result page may indicate an amount of selling entities that passed all of the buying entity's "hard" filter criteria.

For example, if there are eight separate selling entities associated with the URL "www.thiscompany.com," and if only six of those selling entities pass all of the buying entity's "hard" filter criteria, then the search result associated with the URL may indicate that "six passed" the buying entity's "hard" filter criteria. This gives the buying entity some idea about whether the selling entities associated with the search result's URL are the kind of selling entities with which the buying entity typically wants to do business.

In one embodiment of the invention, the seller-specific information presented with a particular search result indicates at least two percentages: a percentage of the buying entity's filter criteria that were passed by the selling entity that passed the most of those filter criteria among selling entities associated with the search result's URL, and a percentage of the buying entity's filter criteria that were passed by the selling entity that passed the least of those filter criteria among selling entities associated with the search result's URL. These percentages are also called "filter scores." For example, if, among selling entities associated with the URL "www.thiscompany.com," the selling entity that passed the most of the buying entity's filter criteria passed 98%, and the selling entity that passed the least of the buying entity's filter criteria passed only 35%, then the seller-specific information for that URL's corresponding search result may indicate that the filter criteria passing range for selling entities associated with that URL is 35%-98%.

VII. Buyer-Specific Trusted Buyer Network Indication

U.S. patent application Ser. No. 11/153,929 describes how a buying entity can add other registered buying entities into his "trusted buyer network." The composition of a buying entity's trusted buyer network may be maintained in a database (e.g., the "B2B" database). Essentially, a particular buying entity's trusted buyer network comprises the other registered buying entities that the buying entity has found to be reliable through experience. The opinions of buying entities in a trusted buyer network may be considered more reliable than the opinions of others.

As is described in U.S. patent application Ser. No. 11/153,929, for each registered selling entity, an on-line business-to-business connectivity service can keep track of which registered buying entities have done business with that selling entity. For example, the service can keep track of which buying entities have entered, with a particular selling entity, into any phase of the multi-phase pipeline mentioned above.

In one embodiment of the invention, if the user who submitted the query terms is a registered buying entity who has an associated trusted buyer network, then this information can be used to inform the user about whether any of the selling entities associated with a particular search result's URL has ever done business with any buying entity in the user's trusted buyer network. In one embodiment of the invention, in addition to other seller-specific information discussed above, the information displayed in conjunction with a search result indicates a number of registered buying entities in the user's trusted buyer network who have done business (according to information maintained by the on-line business-to-business connectivity service) with any of the selling entities that are associated with that search result's URL. This number is referred to herein as the "trusted buyer network indicator."

For example, in one embodiment of the invention, if a user's trusted buyer network contains five registered buying entities, and if one of these buying entities is known to have previously interacted with any selling entity associated with the URL "www.thiscompany.com," then the search result corresponding to that URL indicates that one of the buying entities in the user's trusted buyer network has interacted with such a selling entity in the past. The user may find this information useful in deciding whether to investigate the search result further. Based on this information, the user may investigate whether the trusted buying entity rated the selling entity, and how good or bad that rating was. As is discussed above, the opinions of those whom the user knows and trusts are more useful to the user than the opinions of those with whom the user has no relationship.

As with the filter result information discussed above, the trusted buyer network indicator is customized based on the data associated with the user who submitted the query terms. Thus, in one embodiment of the invention, different users may see different information associated with the same search results.

VIII. Extensible Display

The space available to display related selling entity information on a search results page may be limited. Therefore, according to one embodiment of the invention, each search result for which seller-specific information is available, as described above, additionally comprises a link to a resource on the Internet site of the on-line business-to-business connectivity service (e.g., a page on "www.myhandshake.com"). For example, the link might read, "more information." The resource to which the link refers may be an executable program that dynamically generates a page that comprises information about selling entities that are related to the search result's URL.

FIG. 2 is a diagram that illustrates an example of the selling entity information that may be presented on such a dynamically generated page. In FIG. 2, table 200 comprises a filter column 202, a seller column 204, a company column 206, and a product column 208. The rows of table 200 are divided into two main sections: rows 210, which correspond to selling entities that passed all of the user's hard filters, and row 212, which correspond to selling entities that failed to pass at least one of the user's hard filters. Information in the table is derived from a database (e.g., the "B2B" database), in which associations between selling entities and URLs are stored.

Seller column 204 indicates the identities of the seller entities that are associated with the search result's URL. In this example, seller column 204 also indicates rating information, which was previously supplied by other registered buying entities, for that selling entity. Further, in this example, seller column 204 also indicates a number of "ongoing relationship" phases in which that seller is currently involved, as described above. Additionally, in this example, seller column 204 also indicates, where applicable, a "trusted buyer network indicator."

Company column 206 indicates the identities of the companies with which each selling entity is associated. The same URL may be associated with multiple different companies. Additionally, in this example, company column 206 also indicates rating information, which was previously supplied by other registered buying entities, for that company. As is discussed above, ratings for companies may be separate from ratings for selling entities that are associated with those companies.

Product column 208 indicates the products with which each selling entity is associated. Additionally, in this example, product column 208 also indicates rating information, which was previously supplied by other registered buying entities, for that product. If there is more than one product associated with a particular selling entity, then product column 208 may indicate the words "more than one." As is discussed above, ratings for products may be separate from ratings for selling entities that are associated with those products.

In one embodiment of the invention, each row additionally comprises links that allow a user to ask a selling entity a question anonymously or extend an invitation to the selling entity through the on-line business-to-business connectivity service, as is described further in U.S. patent application Ser. Nos. 11/153,929 and 10/752,163.

In an alternative embodiment of the invention, instead of being presented on a page that is separate from the search results page, table 200 appears in a "pop-up" box in response to a user's activation of a user interface control on the search results page. Such a "pop-up" box may be implemented through code (e.g. Java code) embedded within the search results page. The "pop-up" box may be opened and closed, thereby revealing or obscuring the detailed rating information as the user desires.

In one embodiment of the invention, some or all of the rating information discussed above, and/or other seller-specific information, appears in response to the user moving his mouse pointer over a specified section of a search result. In such an embodiment of the invention, some or all of the rating information and/or other seller-specific information may disappear in response to the user removing his mouse pointer from over the specified section of the search result.

IX. Sorting Search Results

According to one embodiment of the invention, the search results page, on which the several search results returned by the Internet search engine are displayed, comprises user-selectable mechanisms through which the search results can be sorted based on certain criteria, thereby changing the order of the search results in the list of search results. These mechanisms may be implemented as selectable links or controls on the search results page, for example. The selection of these mechanisms may cause the user's Internet browser to send sorting criteria to the Internet search engine, which then sends a revised page, with sorted results, to the user's Internet browser. The Internet search engine may sort all of the search results—not just those displayed on the search results page. Thus, sorting may cause an entirely different set of search results from the list of search results to be displayed.

For example, one such sorting mechanism may cause search results to be sorted based on rating information. Search results whose URLs are associated with higher rating information may be placed closer to the top of the list than search results whose URLs are associated with lower rating information, for example.

For another example, one such sorting mechanism may cause search results to be sorted based on how many selling entities associated with each search result's URL passed all of the user's hard filters. Search results whose URLs are associated with more selling entities that passed all of the user's hard filters may be placed closer to the top of the list than search results whose URLs are associated with fewer selling entities that passed all of the user's hard filters, for example. One sorting mechanism may cause search results to be sorted based on filter scores computed for the selling entities associated with those search results' URLs.

For yet another example, one such sorting mechanism may cause search results to be sorted based on how many registered buying entities in the user's trusted buyer network (discussed above) have previously interacted with selling entities that are associated with a search result's URL. Search results associated with larger numbers in this area may be placed closer to the top of the list than search results associated with smaller numbers in this area, for example.

X. Narrowing the Scope of Search Results

According to one embodiment of the invention, the search results page comprises user-selectable mechanisms through which a user can narrow the scope of the search results based on specified criteria, thereby reducing the quantity of search results by "filtering out" search results that do not satisfy the specified criteria. The selection of these mechanisms may cause the user's Internet browser to send filtering criteria to the Internet search engine, which then sends a revised page, with filtered and narrowed results, to the user's Internet browser.

For example, using one such filtering mechanism, a user may cause all search results corresponding to URLs that are not associated with any registered selling entities to be excluded from the search results page. The use of this mechanism causes only those search results for which seller-specific information (e.g., rating information from registered buying entities) is available to be displayed on the search results page.

For another example, using one such filtering mechanism, a user may cause only the search result associated with a URL that is associated with the highest rating information to be displayed on the search results page.

For another example, using one such filtering mechanism, a user may cause all search results corresponding to URLs that are not associated with any registered selling entity that passes all of the user's hard filters to be excluded from the search results page. The use of this mechanism causes only those search results that are associated with a URL that is associated with at least one selling entity that passed all of the user's hard filters to be displayed on the search results page.

For another example, using one such filtering mechanism, a user may cause only the search results that are associated with a filter score (discussed above) that is above a specified threshold (e.g., 75%) to be displayed on the search results page.

For another example, using one such filtering mechanism, a user may cause only the search results that are associated with at least one trusted buyer network connection to be displayed on the search results page. The use of this mechanism causes only search results that are associated with a URL that is associated with at least one selling entity that has previously interacted with a registered buying entity in the user's trusted buyer network to be displayed on the search results page. Thus, by using such a mechanism, the list of search results can be narrowed, generally, to those that are known by registered buying entities whose opinions the user trusts.

The above discussion is not meant to present a completely exhaustive list of ways in which search results can be filtered. Search results can be filtered based on any conceivable criteria, such as the number of ongoing relationships associated with those search results, etc.

XI. Encouraging New Selling Entities to Participate

As is described above, seller-specific information that is associated with selling entities that are associated with search results' corresponding URLs may be presented next to those search results within a search results page. However, in order for such seller-specific information to be available, in one embodiment of the invention, selling entities need to register with the on-line business-to-business connectivity service by establishing an account as discussed above. After a registered selling entity has been associated with a URL and received a rating from a registered buying entity, then that rating can be used to generate at least a portion of the seller-specific information for search results that are associated with that URL.

In one embodiment of the invention, mechanisms are provided which allow a user of an Internet search engine to encourage selling entities to register with the on-line business-to-business connectivity service as selling entities. In one embodiment of the invention, for each search result on a search results page, if that search result's URL is not associated with any registered selling entities, an "invitation" link is displayed in close proximity to that search result. The text of the "invitation" link might read, "invite company to display their track record," for example.

In one embodiment of the invention, when the user activates such a link, the user's Internet browser is redirected to a "contact us" page on the "web site" of the company that is associated with the search result's URL. Such a page may be registered with the Internet search engine, for example. This page may comprise a form with fields through which a user can submit, to the company, an invitation for the company's employees to join and register with the on-line business-to-business connectivity service (e.g., "www.my-handshake.com") as selling entities.

In one embodiment of the invention, an application executing in conjunction with the user's Internet browser causes recognized fields of such a form to be populated automatically with text that gives the company's employees instructions on how to join. In another embodiment of the invention, the selection of the "invitation" link causes a text box to open (e.g., within another instance of the Internet browser). The text box contains recommended text that the user can cut and paste into the fields of the company's form in order to encourage the company's employees to register with the on-line business-to-business connectivity service as selling entities.

In an alternative embodiment of the invention, when the user activates an "invitation" link, an e-mail client program, such as Microsoft Outlook, is automatically invoked on the user's computer. The e-mail client program may be invoked by embedded code (e.g., Java code) that is associated with the "invitation" link, for example. A new e-mail message may be opened. The body of the new e-mail message may be automatically populated with service registration instructions as discussed above. The "to" address of the new e-mail message also may be automatically populated with e-mail addresses that are associated with the search result's URL. Such e-mail addresses may be automatically discovered by a program that automatically searches all of the pages at the search result's URL for any information that is indicative of an e-mail address (e.g., "mailto:" tags). The user can edit aspects of the new e-mail message prior to sending the e-mail message to the specified e-mail addresses.

In one embodiment of the invention, service registration information is not immediately sent to anyone in response to the activation of an "invitation" link. Instead, in one embodiment of the invention, the activation of the "invitation" link causes a count, associated with the appropriate search result's URL, to be incremented within a database (e.g., the "B2B" database). When the count reaches a specified threshold, a computer program executing on a machine (e.g., a machine owned by the on-line business-to-business connectivity service) automatically generates an e-mail message of the kind described above and sends the e-mail message to known or automatically discovered e-mail addresses as described above. In one embodiment of the invention, such an e-mail message is automatically generated and sent on a periodic basis (e.g., weekly or monthly).

In one embodiment of the invention, the e-mail message that is automatically generated and sent, as described above, comprises a link that identifies (to the on-line business-to-business connectivity service if not the message recipient) a buyer entity account of the user who submitted the query terms. The e-mail message may invite the e-mail message recipient to click on the link in order to be directed to a page on the connectivity service's "web site" (e.g., "www.my-handshake.com"). This page comprises mechanisms that allow the e-mail message recipient to register with the connectivity service and enter the first stage of the multi-stage pipeline (discussed above) with the user.

XII. Encouraging New Buying Entities to Participate

When a buying entity registers with the on-line business-to-business connectivity service, it allows the seller-specific information presented with the search results to be tailored and customized based on preferences and criteria associated with the buying entity's account. Therefore, in one embodiment of the invention, if the search engine or toolbar application cannot determine that the user to whom the search results are going to be presented has an account with the service (e.g., because there is no appropriate "cookie" stored on the user's computer and the user did not sign in), then the search results page is modified to include one or more invitations for the user to register with the service. In various embodiments of the invention, the modification discussed below may be performed either by the search engine, when the search engine dynamically generates the search results page, or by the toolbar application, when the toolbar application intercepts a search results page.

In one embodiment of the invention, the search results page is modified to include a link that says, "sort by your filter score loin)." In one embodiment of the invention, the search results page is modified to include a link that says, "sort by trusted connections (join)." These links are intended to give the user a preview of customized sorting features to which he would have access if he established an account with the on-line business-to-business connectivity service. In one embodiment of the invention, when the user activates one of these links, the user's browser is directed to a page on the "web site" of the on-line business-to-business connectivity service. The page instructs the user on how to establish an account, and initiates the process by which the user establishes an account.

In one embodiment of the invention, the search results page is modified to include, with each search result for which associated seller-specific information is available, a link that says "join for filter score info." Thus, the links entice the user to join the service in order to obtain filter score information that is customized based on the user's specified preferences and filter criteria. When the user activates one of these links, the user's browser is directed to the account establishment page of the on-line business-to-business connectivity service.

XIII. Architectural Examples

In one embodiment of the invention, the enhanced buyer-oriented information discussed above, such as rating information, is inserted into the code of the search results page by the Internet search engine at the time that the Internet search engine generates the search results page. The Internet search engine then sends the search results page, complete with the enhanced buyer-oriented information, to the user's Internet browser. In such an embodiment of the invention, the Internet search engine has access to the selling entity information. For example, the Internet search engine may obtain the selling entity rating information, as well as mappings between selling entities and URLs, from a "B2B" database that is populated by users of the on-line business-to-business connectivity service.

However, in some embodiments of the invention, the Internet search engine might not have access to such a "B2B" database or any of the selling entity rating information or selling entity-to-URL mapping information that would be stored therein. In some embodiments of the invention, the Internet search engine might not even be "aware" of such information at all. In some embodiments of the invention, the Internet search engine sends, to a user's Internet browser, a regular, un-enhanced search results page of the kind currently returned by popular Internet search engines such as those offered by Google and Yahoo!

In embodiments of the invention in which the Internet search engine sends a regular, un-enhanced search results page toward a user's Internet browser, the enhanced buyer-oriented information may be added to the search results page at the user's computer by a toolbar application that executes in conjunction with the user's Internet browser. The toolbar application is capable of accessing the information in a "B2B" database that is remote from the user's computer. For example, the toolbar application may access such information via the Internet.

In one embodiment of the invention, whenever a page is received by the Internet browser application, the toolbar application parses the page to determine whether the page contains search results from an Internet search engine. There are various ways in which the toolbar might make such a determination. For example, the toolbar application might determine whether the URL from which the page came is associated with a recognized Internet search engine.

If the toolbar application determines that the page contains search results from an Internet search engine, then, before the Internet browser displays the page, the toolbar application modifies the code of the page, inserting, at appropriate places within the page, available enhanced buyer-oriented information, such as rating information. For example, if the toolbar application determines that one of the search results on the original page is associated with the URL "www.thiscompany.com," then the toolbar application may query the remote "B2B" database via the Internet in order to determine whether any selling entities are associated with the URL "www.thiscompany.com."

If the toolbar application determines that there is at least one selling entity associated with that URL, then the toolbar application may retrieve, from the remote "B2B" database, seller-specific information that is associated with that selling entity and any other selling entities associated with the URL. The toolbar application may insert, into the code of the search results page at which the corresponding search result occurs, seller-specific information that the toolbar application retrieved from the "B2B" database. After the toolbar application has modified the code of the page in this manner for each search result for which enhanced buyer-oriented information is available, the toolbar application may cause the Internet browser, with which the toolbar application is at least partially integrated, to display the modified search results page.

As is discussed above, some of the enhanced buyer-oriented information that is displayed in conjunction with a search result may depend on attributes or characteristics that are associated with the user's buying entity account on the on-line business-to-business connectivity service. For example, the number of selling entities that passed a user's hard filters depends on what those hard filters are. According to one embodiment of the invention, the toolbar application accesses information associated with the user's buying entity account on the remote "B2B" database. The toolbar application uses this information in order to customize at least some of the enhanced buyer-oriented information based on the user's specified attributes, characteristics, preferences, and settings.

In one embodiment of the invention, the toolbar application provides a "sign-in" mechanism through which the user supplies the identity of his buying entity account. The toolbar application may use this identity to locate the appropriate information in the remote "B2B" database, which may be hosted by the on-line business-to-business connectivity service. In an alternative embodiment of the invention, the toolbar application identifies the user's buyer entity account by reading a "cookie" that is stored on the user's computer when the user establishes the buyer entity account with the on-line connectivity service.

In yet another alternative embodiment of the invention, a page provided by the Internet search engine—such as the page on which the user enters the query terms, for example—comprises a form with "sign-in" fields through which the user can supply his buyer entity account identity and an associated password. The Internet search engine may use the buyer entity account identity to retrieve information from the user's buyer entity account and generate customized enhanced information for display with search results.

According to one embodiment of the invention, a user can select options through menus provided by the toolbar application. For example, in one embodiment of the invention, a user can select, in such menus, criteria by which search results should be sorted and/or criteria by which search results should be filtered. Consequently, these options do not need to be indicated on or accessed via the search results page itself—although, in one embodiment of the invention, these options can be indicated on and accessed via the search results page. The toolbar application can intercept a search results page sent from an Internet search engine and parse and modify the code of the search results page so that search results are filtered and/or sorted according to the user's indicated wishes.

In one embodiment of the invention, a toolbar application as described above can be downloaded via the Internet. When the toolbar application is installed, the installation program automatically integrates the toolbar application into the user's Internet browser application so that the toolbar application and the Internet browser application can communicate with each other.

XIV. Resolving URLs

As is discussed above, selling entities may be associated with URLs in a "B2B" database. Typically, a selling entity would supply a URL with which that selling entity should be associated at the time that the selling entity initially establishes an account with the on-line business-to-business connectivity service. These URLs can be matched automatically with the URLs in a search results page in order to provide enhanced buyer-oriented information that corresponds to the selling entities that are associated with the matching URLs.

However, sometimes at least one URL in a search results page will not exactly match a URL associated with a selling entity even though the URL in the search results page actually does correspond to the URL associated with the selling entity. For example, a selling entity might be associated with the URL "www.thiscompany.com" (because that is the URL that the selling entity supplied at registration), but a search result might comprise the URL "www.thiscompany.com/topdirectory/middledirectory/bottomdirectory/file.html." Under these circumstances, seller-specific information associated with the selling entity should be displayed with the search result, even though the two URLs are not exactly the same.

Therefore, in one embodiment of the invention, registered URLs in the "B2B" database are matched with URLs in a search results page in the following manner. First, it is determined whether there is an exact match between the URL in the search results page and any of the registered URLs in the "B2B" database. If there are no exact matches, then it is determined whether there is a match between the domain name of the URL (i.e., the portion of the URL that comes before the first "/") in the search results page and any of the registered URLs in the "B2B" database.

For example, if the URL associated with a particular search result is "www.thiscompany.com/topdirectory/middledirectory/bottomdirectory/file.html," then it is determined, first, whether there is any registered URL that is exactly the same. If there is a registered URL that is exactly the same, then ratings associated with registered selling entities associated with that URL are used to generate the enhanced buyer-oriented information to be displayed with the particular search result. Alternatively, if there is no registered URL that is exactly the same, then it is determined whether there is any registered URL that is the same as "www.thiscompany.com" (the domain name of the URL in the particular search result). If there is a registered URL that is the same as "www.thiscompany.com," then ratings associated with registered selling entities associated with that URL are used to generate the enhanced buyer-oriented information to be displayed with the particular search result.

Otherwise, it is determined that there is not yet any enhanced buyer-oriented information that can be displayed with the particular search result.

XV. Ownership Considerations

In one embodiment of the invention, the company that owns the Internet search engine also owns, or is in a joint venture with another company that owns, a "B2B" database that stores all of the selling entity information and buying entity information described above. In such an embodiment, the Internet search engine may insert all of the enhanced buyer-oriented information into the search results page as the search results page is generated.

In another embodiment of the invention, the company that owns the Internet search engine has no business relationship with the company that owns the "B2B" database. In such an embodiment, a toolbar application can be used to intercept and automatically enhance search result pages from Internet search engines before those search result pages are displayed in an Internet browser, as is discussed above. The toolbar application may be designed to be compatible with search result pages from multiple different Internet search engines.

XVI. Basing Per-Click Charges on Buying Entity Attributes

As is discussed above in the Overview, selling entities may specify criteria that a buying entity must satisfy in order to qualify as a buying entity in which that selling entity is interested. In one embodiment of the invention, when a registered buying entity activates a link corresponding to a particular search result within a search results page (e.g., by clicking on the particular link with his mouse), a determination is made as to the extent to which that buying entity's attributes satisfy the criteria of a selling entity that is associated with the URL of the particular search result. In one embodiment of the invention, the amount of money that the Internet search engine company charges the selling entity in response to the activation of the link is based on the extent to which the buying entity's attributes satisfy the selling entity's criteria.

For example, if the buying entity is exactly the kind of buying entity that the selling entity wants to lead to its page, as evidenced by the buying entity's attributes satisfying all or nearly all of the selling entity's specified criteria, then the Internet search engine company may charge the selling entity a relatively high fee in response to the buying entity activating a link that corresponds to the selling entity. Alternatively, if the buying entity is not even close to being the kind of buying entity that the selling entity wants to lead to its page, as evidenced by the buying entity's attributes satisfying none or nearly none of the selling entity's specified criteria, then the Internet search engine company may charge the selling entity a relatively low fee in response to the buying entity activating a link that corresponds to the selling entity. The selling entity may be charged a percentage of the full fee, where the percentage is based on the percentage of the selling entity's criteria that the buying entity's attributes satisfy.

Thus, a selling entity might be charged more when the CEO (Chief Executive Officer) of a Fortune 500 company clicks on the selling entity's corresponding link in the search results than when an unemployed teenager clicks on that link (assuming that the selling entity's criteria indicate that the selling entity is more interested in CEOs of Fortune 500 companies than in unemployed teenagers).

XVII. Obscuring Search Results from Unqualified Buying Entities

According to one embodiment of the invention, if the user to whom a search results page is going to be presented is a registered buying entity, and if the user's buying entity attributes do not satisfy a particular selling entity's criteria, as specified in the particular selling entity's attributes, then search results that are associated with a URL that is associated with the particular selling entity are omitted or removed from the search results page before the search results page is presented to the user. An Internet search engine or a toolbar application may omit or remove the search results, for example. Thus, a buying entity known to not satisfy a selling entity's criteria is not shown the search result with whose URL the selling entity is associated.

By preventing certain search results from being seen by unqualified buying entities, the selling entity is spared the burden of dealing with a buying entity in which the selling entity is clearly not interested. The selling entity also avoids potentially paying a fee for "clicks" by unqualified and uninteresting buying entities. This technique also spares the buying entity from attempting to deal with a selling entity which is likely to be disinterested in doing business with the buying entity. Thus, both buying entities and selling entities benefit from this technique.

Figure 4:
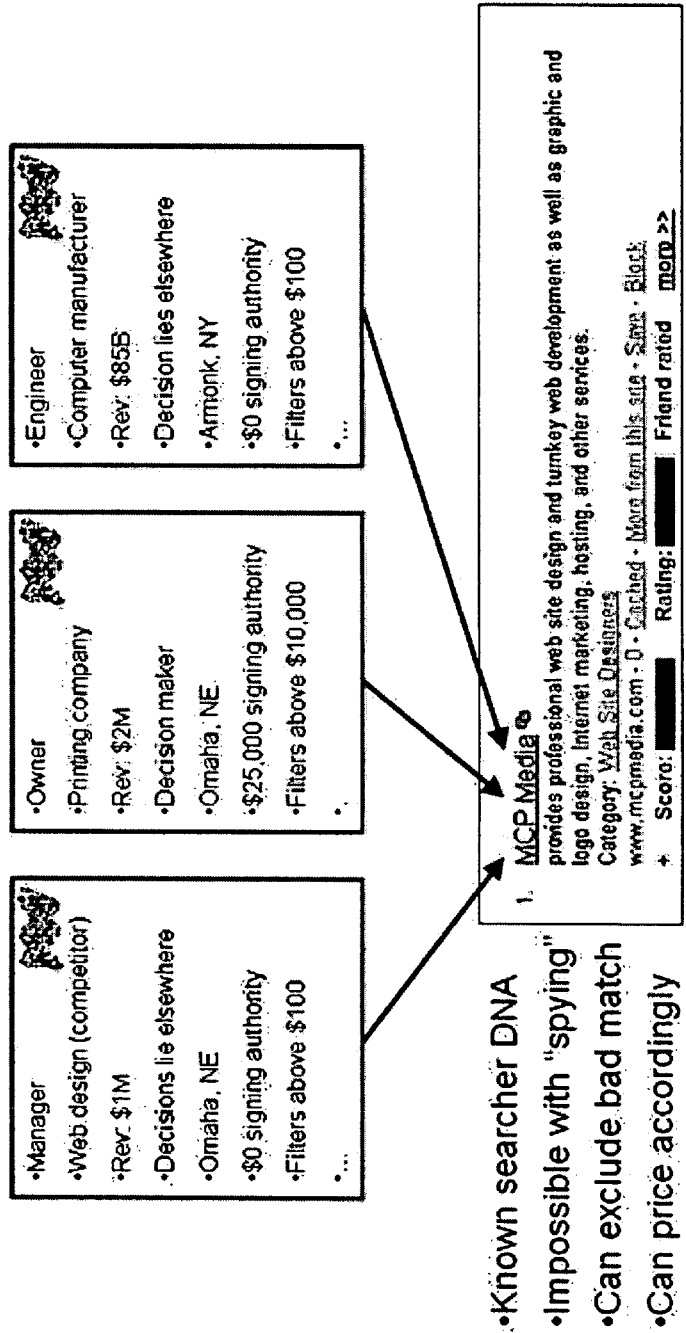
FIG. 4 is a diagram that illustrates a search result and the sets of attributes of several buying entities in whom a selling entity associated with the search result's URL may or may not be interested, according to an embodiment of the invention.

FIG. 4 is a diagram that illustrates a search result and the sets of attributes of several buying entities in whom a selling entity associated with the search result's URL may or may not be interested, according to an embodiment of the invention. Each buying entity's set of attributes represents a sort of "DNA" of that that buying entity. As shown in the figure, a first buying entity's "DNA" reveals that the first buying entity is a manager who does business in Omaha, Nebr. among other attributes. A second buying entity's "DNA" reveals that the second buying entity is an owner who also does business in Omaha, Nebr. among other attributes. A third buying entity's DNA reveals that the third buying entity is an engineer who does business in Armonk, N.Y.

Assuming that the selling entity associated with the URL for the illustrated search result is associated with criteria that indicate that the selling entity is only interested in buying entities who are both (a) owners and (b) in Omaha, Nebr. the first and third buying entity are not of interest to the selling entity, but the second buying entity is. Therefore, in one embodiment of the invention, the illustrated search result may be omitted or removed from a search results page that is going to be presented to the first buyer or the third buyer before the search results page is presented to the first buyer or the third buyer.

XVIII. Implementation Mechanisms, Alternatives & Extensions

Figure 3:
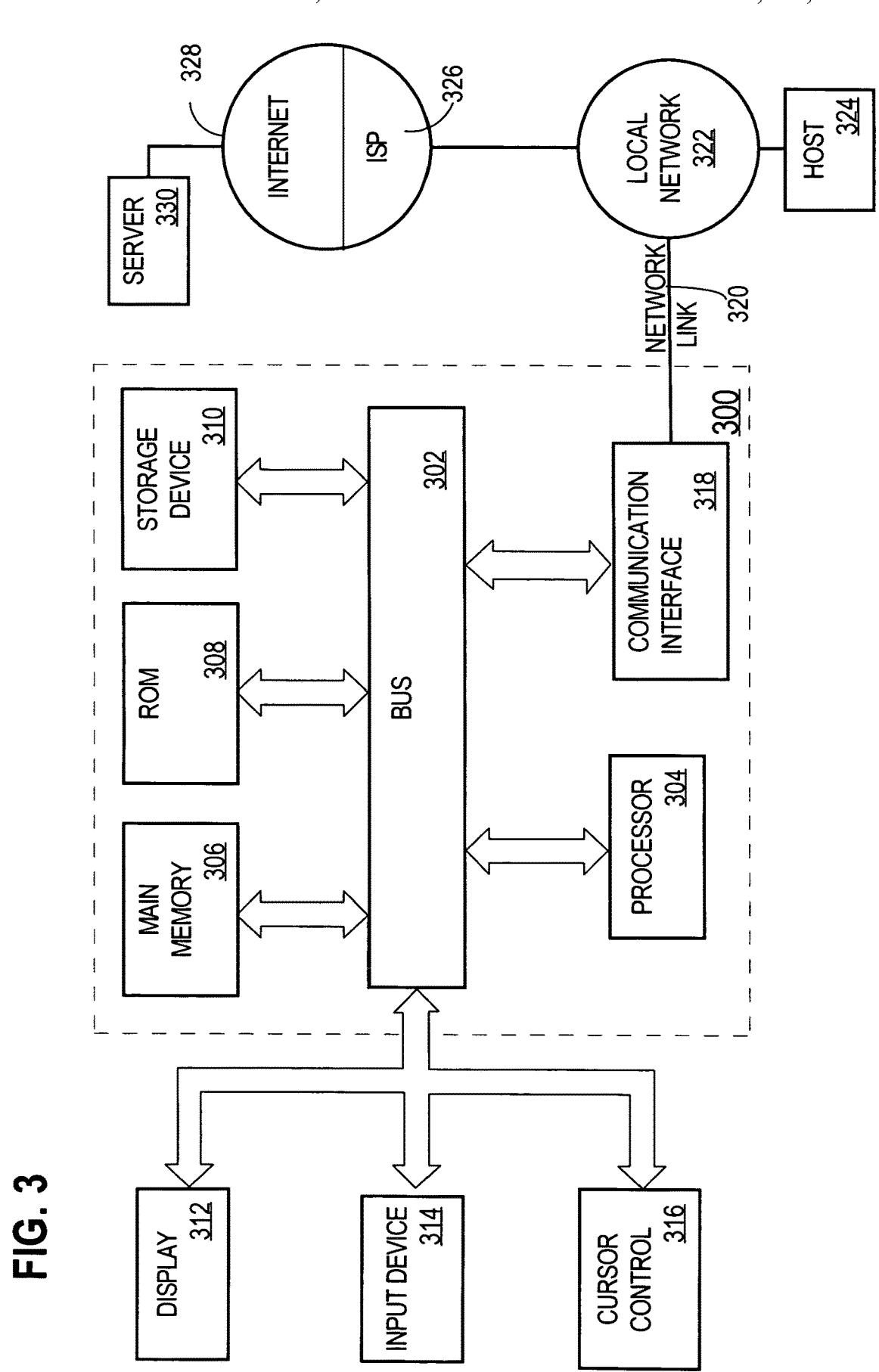
FIG. 3 is a block diagram that illustrates a computer system upon which an embodiment of the invention may be implemented.

The approach described herein for generating enhanced buyer-oriented Internet search results is applicable to a variety of contexts and implementations and is not limited to a particular context or implementation. FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for facilitating business-to-business personal connections by enhancing Internet search engine results, the method comprising the following machine-implemented steps of:

generating and transmitting for display, based at least in part on a list of search results generated by an Internet search engine that queries the World Wide Web and that is not limited by any number of websites, seller-specific information of one or more selling entities associated with at least a portion of a Uniform Resource Locator (URL) of a search result in the list of search results;
wherein the one or more selling entities are individual persons;
wherein the seller-specific information comprises attributes of the one or more selling entities;
wherein the list of search results is based on one or more query terms that a person supplied to the Internet search engine, and wherein the step of generating and transmitting for display the seller-specific information is performed by a toolbar application executed on a computer from which the person entered the one or more query terms; and
wherein the toolbar application adds the seller-specific information to the search result in the list of search result.

2. A method for facilitating business-to-business personal connections by enhancing Internet search engine results, the method comprising the following machine-implemented steps of:
generating and transmitting for display, based at least in part on a list of search results generated by an Internet search engine that queries the World Wide Web and that is not limited by any number of websites, seller-specific information of one or more selling entities associated with at least a portion of a Uniform Resource Locator (URL) of a search result in the list of search results;
wherein the one or more selling entities are individual persons;
wherein the seller-specific information comprises attributes of the one or more selling entities;
wherein the seller-specific information comprises:
one or more ratings of the one or more selling entities;
one or more ratings of one or more companies with which the one or more selling entities are associated; and
one or more ratings of one or more products with which the one or more selling entities are associated;
wherein the one or more ratings of the one or more selling entities differ from the one or more ratings of the one or more companies; and
wherein the one or more ratings of the one or more selling entities differ from the one or more ratings of the one or more products.

3. A method for facilitating business-to-business personal connections by enhancing Internet search engine results, the method comprising the following machine-implemented steps of:
generating and transmitting for display, based at least in part on a list of search results generated by an Internet search engine that queries the World Wide Web and that is not limited by any number of websites, seller-specific information of one or more selling entities associated with at least a portion of a Uniform Resource Locator (URL) of a search result in the list of search results;
wherein the one or more selling entities are individual persons;
wherein the seller-specific information comprises attributes of the one or more selling entities;
wherein the list of search results is based on one or more query terms that a person supplied to the Internet search engine; and wherein the seller-specific information indicates how many selling entities passed, and how many selling entities failed one or more hard filters that are specified by the person.

4. The method of claim 3, wherein the step of generating the seller-specific information is performed by the Internet search engine, and wherein the Internet search engine generates and transmits for display a search results page that comprises the seller-specific information before sending the search results page toward a browser.

5. The method of claim 3, wherein the seller-specific information comprises a number of the one or more selling entities.

6. The method of claim 3, wherein the seller-specific information indicates how many of the one or more selling entities satisfy filter criteria that are specified by the person.

7. The method of claim 3, wherein the seller-specific information indicates a filter score associated with the one or more hard filters.

8. The method of claim 3, further comprising a machine-implemented step of sorting the list of search results based at least in part on at least a portion of the seller-specific information.

9. The method of claim 3, further comprising a machine-implemented step of excluding one or more search results from the list of search results based at least in part on at least a portion of the seller-specific information.

10. The method of claim 3, further comprising a machine-implemented step of generating and transmitting for display a search results page that comprises a link that invites a user, different from the person, to register as a buying entity in order to obtain access to customized features.

11. A method for facilitating business-to-business personal connections by enhancing Internet search engine results, the method comprising the following machine-implemented steps of:
generating and transmitting for display, based at least in part on a list of search results generated by an Internet search engine that queries the World Wide Web and that is not limited by any number of websites, seller-specific information of one or more selling entities associated with at least a portion of a Uniform Resource Locator (URL) of a search result in the list of search results;
wherein the one or more selling entities are individual persons;
wherein the seller-specific information comprises attributes of the one or more selling entities;
wherein the seller-specific information indicates a count of selling entities of the one or more selling entities who are currently involved in ongoing relationships that permit corresponding buying entities also involved in the ongoing relationships to re-rate, in the future, the selling entities that are involved in the ongoing relationships.

12. A method for facilitating business-to-business personal connections by enhancing Internet search engine results, the method comprising the following machine-implemented steps of:
generating and transmitting for display, based at least in part on a list of search results generated by an Internet search engine that queries the World Wide Web and that is not limited by any number of websites, seller-specific information of one or more selling entities associated with at least a portion of a Uniform Resource Locator (URL) of a search result in the list of search results;
wherein the one or more selling entities are individual persons;

wherein the seller-specific information comprises attributes of the one or more selling entities;
wherein the list of search results is based on one or more query terms that a person supplied to the Internet search engine;
wherein the seller-specific information indicates how many buying entities in a specified set of trusted buying entities have previously interacted with the one or more selling entities; and
wherein a composition of the specified set of trusted buying entities is specified by the person.

13. A method for facilitating business-to-business personal connections by enhancing Internet search engine results, the method comprising the following machine-implemented steps of:
generating and transmitting for display, based at least in part on a list of search results generated by an Internet search engine that queries the World Wide Web and that is not limited by any number of websites, seller-specific information of one or more selling entities associated with at least a portion of a Uniform Resource Locator (URL) of a search result in the list of search results;
wherein the one or more selling entities are individual persons;
wherein the seller-specific information comprises attributes of the one or more selling entities;
wherein the method further comprises a machine-implemented step of generating and transmitting for display a search results page that comprises a link that, when activated by a buying entity, causes an e-mail message to be generated; and
wherein the e-mail message comprises an invitation to another individual, different from the buying entity, to register as a selling entity.

14. A method for facilitating business-to-business personal connections by enhancing Internet search engine results, the method comprising the following machine-implemented steps of:
generating and transmitting for display, based at least in part on a list of search results generated by an Internet search engine that queries the World Wide Web and that is not limited by any number of websites, seller-specific information of one or more selling entities associated with at least a portion of a Uniform Resource Locator (URL) of a search result in the list of search results;
wherein the one or more selling entities are individual persons;
wherein the seller-specific information comprises attributes of the one or more selling entities;
wherein the URL is a particular URL, and the method further comprising machine implemented steps of:
determining and transmitting for display a set of selling entities that is associated with a URL that is the same as the particular URL; and
determining and transmitting for display a set of selling entities that is associated with a URL that comprises a domain name of the particular URL.

15. A non-transitory machine-readable storage medium storing one or more sequences of instructions which, when executed by one or more processors, cause the one or more processors to perform steps of:
generating and transmitting for display, based at least in part on a list of search results generated by an Internet search engine that queries the World Wide Web and that is not limited by any number of websites, seller-specific information of one or more selling entities associated with at least a portion of a Uniform Resource Locator (URL) of a search result in the list of search results;
wherein the one or more selling entities are individual persons;
wherein the seller-specific information comprises attributes of the one or more selling entities;
wherein the list of search results is based on one or more query terms that a person supplied to the Internet search engine, and wherein the step of generating and transmitting for display the seller-specific information is performed by a toolbar application executed on a computer from which the person entered the one or more query terms; and
wherein the toolbar application adds the seller-specific information to the search result in the list of search result.

16. A non-transitory machine-readable storage medium storing one or more sequences of instructions which, when executed by one or more processors, cause the one or more processors to perform steps of:
generating and transmitting for display, based at least in part on a list of search results generated by an Internet search engine that queries the World Wide Web and that is not limited by any number of websites, seller-specific information of one or more selling entities associated with at least a portion of a Uniform Resource Locator (URL) of a search result in the list of search results;
wherein the one or more selling entities are individual persons;
wherein the seller-specific information includes attributes of the one or more selling entities, comprising:
one or more ratings of the one or more selling entities;
one or more ratings of one or more companies with which the one or more selling entities are associated; and
one or more ratings of one or more products with which the one or more selling entities are associated;
wherein the one or more ratings of the one or more selling entities differ from the one or more ratings of the one or more companies; and
wherein the one or more ratings of the one or more selling entities differ from the one or more ratings of the one or more products.

17. A non-transitory machine-readable storage medium storing one or more sequences of instructions which, when executed by one or more processors, cause the one or more processors to perform steps of:
generating and transmitting for display, based at least in part on a list of search results generated by an Internet search engine that queries the World Wide Web and that is not limited by any number of websites, seller-specific information of one or more selling entities associated with at least a portion of a Uniform Resource Locator (URL) of a search result in the list of search results;
wherein the one or more selling entities are individual persons;
wherein the seller-specific information comprises attributes of the one or more selling entities;
wherein the seller-specific information indicates a count of selling entities of the one or more selling entities who are currently involved in ongoing relationships that permit corresponding buying entities also involved in ongoing relationships to re-rate, in the future, the selling entities that are involved in the ongoing relationships.

18. A non-transitory machine-readable storage medium storing one or more sequences of instructions which, when executed by one or more processors, cause the one or more processors to perform steps of:
- generating and transmitting for display, based at least in part on a list of search results generated by an Internet search engine that queries the World Wide Web and that is not limited by any number of websites, seller-specific information of one or more selling entities associated with at least a portion of a Uniform Resource Locator (URL) of a search result in the list of search results;
- wherein the one or more selling entities are individual persons;
- wherein the seller-specific information comprises attributes of the one or more selling entities;
- wherein the list of search results is based on one or more query terms that a person supplied to the Internet search engine;
- wherein the seller-specific information indicates how many buying entities in a specified set of trusted buying entities have previously interacted with the one or more selling entities; and
- wherein a composition of the specified set of trusted buying entities is specified by the person.

19. A non-transitory machine-readable storage medium storing one or more sequences of instructions which, when executed by one or more processors, cause the one or more processors to perform steps of:
- generating and transmitting for display, based at least in part on a list of search results generated by an Internet search engine that queries the World Wide Web and that is not limited by any number of websites, seller-specific information of one or more selling entities associated with at least a portion of a Uniform Resource Locator (URL) of a search result in the list of search results;
- wherein the one or more selling entities are individual persons;
- wherein the seller-specific information comprises attributes of the one or more selling entities;
- wherein the method further comprises a machine-implemented step of generating and transmitting for display a search results page that comprises a link that, when activated by a buying entity, causes an e-mail message to be generated; and
- wherein the e-mail message comprises an invitation to another individual, different from the buying entity, to register as a selling entity.

20. A non-transitory machine-readable storage medium storing one or more sequences of instructions which, when executed by one or more processors, cause the one or more processors to perform steps of:
- generating and transmitting for display, based at least in part on a list of search results generated by an Internet search engine that queries the World Wide Web and that is not limited by any number of websites, seller-specific information of one or more selling entities associated with at least a portion of a Uniform Resource Locator (URL) of a search result in the list of search results;
- wherein the one or more selling entities are individual persons;
- wherein the seller-specific information comprises attributes of the one or more selling entities;
- wherein the URL is a particular URL, and the method further comprising machine implemented steps of:
  - determining and transmitting for display a set of selling entities that is associated with a URL that is the same as the particular URL; and
  - determining and transmitting for display a set of selling entities that is associated with a URL that comprises a domain name of the particular URL.

21. A non-transitory machine-readable storage medium storing one or more sequences of instructions which, when executed by one or more processors, cause the one or more processors to perform steps of:
- generating and transmitting for display, based at least in part on a list of search results generated by an Internet search engine that queries the World Wide Web and that is not limited by any number of websites, seller-specific information of one or more selling entities associated with at least a portion of a Uniform Resource Locator (URL) of a search result in the list of search results;
- wherein the one or more selling entities are individual persons;
- wherein the seller-specific information comprises attributes of the one or more selling entities;
- wherein the list of search results is based on one or more query terms that a person supplied to the Internet search engine; and
- wherein the seller-specific information indicates how many selling entities passed, and how many selling entities failed one or more hard filters that are specified by the person.

22. The non-transitory machine-readable storage medium of claim 21, wherein the step of generating the seller-specific information is performed by the Internet search engine, and wherein the Internet search engine generates and transmits for display a search results page that comprises the seller-specific information before sending the search results page toward a browser.

23. The non-transitory machine-readable storage medium of claim 21, wherein the seller-specific information comprises a number of the one or more selling entities.

24. The non-transitory machine-readable storage medium of claim 21, wherein the seller-specific information indicates how many of the one or more selling entities satisfy filter criteria that are specified by the person.

25. The non-transitory machine-readable storage medium of claim 21, wherein the seller-specific information indicates a filter score associated with the one or more hard filter.

26. The non-transitory machine-readable storage medium of claim 21, wherein the one or more sequences of instructions, when executed by the one or more processors, further cause the one or more processors to perform a step of sorting the list of search results based at least in part on at least a portion of the seller-specific information.

27. The non-transitory machine-readable storage medium of claim 21, wherein the one or more sequences of instructions, when executed by the one or more processors, further cause the one or more processors to perform a step of excluding one or more search results from the list of search results based at least in part on at least a portion of the seller-specific information.

28. The non-transitory machine-readable storage medium of claim 21, wherein the one or more sequences of instructions, when executed by the one or more processors, further cause the one or more processors to perform a step of generating and transmitting for display a search results page that comprises a link that invites a user, different from the person, to register as a buying entity in order to obtain access to customized features.

* * * * *